United States Patent
Lamb et al.

(10) Patent No.: US 9,410,536 B2
(45) Date of Patent: Aug. 9, 2016

(54) SELF-CONTAINED THERMALLY ACTUATED FLOW-CONTROL ASSEMBLY

(75) Inventors: Kevin W. Lamb, West Hartford, CT (US); Kenneth Lionello, Waterbury, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 1080 days.

(21) Appl. No.: 13/495,255

(22) Filed: Jun. 13, 2012

(65) Prior Publication Data
US 2013/0334327 A1 Dec. 19, 2013

(51) Int. Cl.
| | |
|---|---|
| F16K 35/06 | (2006.01) |
| G05D 23/02 | (2006.01) |
| G05D 23/19 | (2006.01) |
| F16K 31/68 | (2006.01) |
| G05D 23/12 | (2006.01) |
| F03G 7/06 | (2006.01) |
| F16K 31/00 | (2006.01) |

(52) U.S. Cl.
CPC ............. *F03G 7/06* (2013.01); *F16K 31/002* (2013.01); *G05D 23/021* (2013.01); *G05D 23/022* (2013.01); *Y10T 137/7737* (2015.04)

(58) Field of Classification Search
CPC ... G05D 23/02; G05D 23/021; G05D 23/022; F16K 31/002
USPC ...................................... 236/99 R, 99 K, 100
See application file for complete search history.

(56) References Cited

U.S. PATENT DOCUMENTS

| | | | | |
|---|---|---|---|---|
| 4,335,690 A | * | 6/1982 | Hosokawa | G05D 23/185 123/406.7 |
| 6,315,210 B1 | * | 11/2001 | Kline | G05D 23/134 236/12.2 |
| 6,772,958 B1 | | 8/2004 | Lamb et al. | |
| 6,915,958 B2 | * | 7/2005 | Colas | F01P 7/167 236/34.5 |
| 6,988,364 B1 | | 1/2006 | Lamb et al. | |
| 7,469,841 B1 | | 12/2008 | Lamb et al. | |
| 7,617,700 B2 | | 11/2009 | Lamb et al. | |
| 2009/0272816 A1 | * | 11/2009 | Lhuillier | G05D 23/12 236/12.11 |
| 2010/0200783 A1 | | 8/2010 | Lamb et al. | |
| 2012/0247582 A1 | | 10/2012 | Lamb et al. | |

\* cited by examiner

*Primary Examiner* — Mohammad M Ali
*Assistant Examiner* — Daniel C Comings
(74) *Attorney, Agent, or Firm* — Alix, Yale & Ristas, LLP

(57) ABSTRACT

A self-contained thermally actuated flow-control valve assembly comprises a base, an actuator, and a return member. The base has a longitudinal axis, a stop surface and a retention wall. The actuator has a generally cylindrical guide, a piston, a diaphragm, a thermally active pellet, and a generally cylindrical cup. The guide has an exterior surface on which a plurality of retention members are configured. The piston assembly is coaxial with the longitudinal axis. The generally cylindrical cup has a leading wall, a sidewall contiguous with the leading wall, and a trailing shoulder axially opposite the leading wall. The return member has axially opposed first and second ends. The first end engages the retention members and the second end engaging the base. The return member exerts a biasing force on the actuator axially towards said base. The actuator exerts a variable actuating force in a direction axially opposite the biasing force.

23 Claims, 8 Drawing Sheets

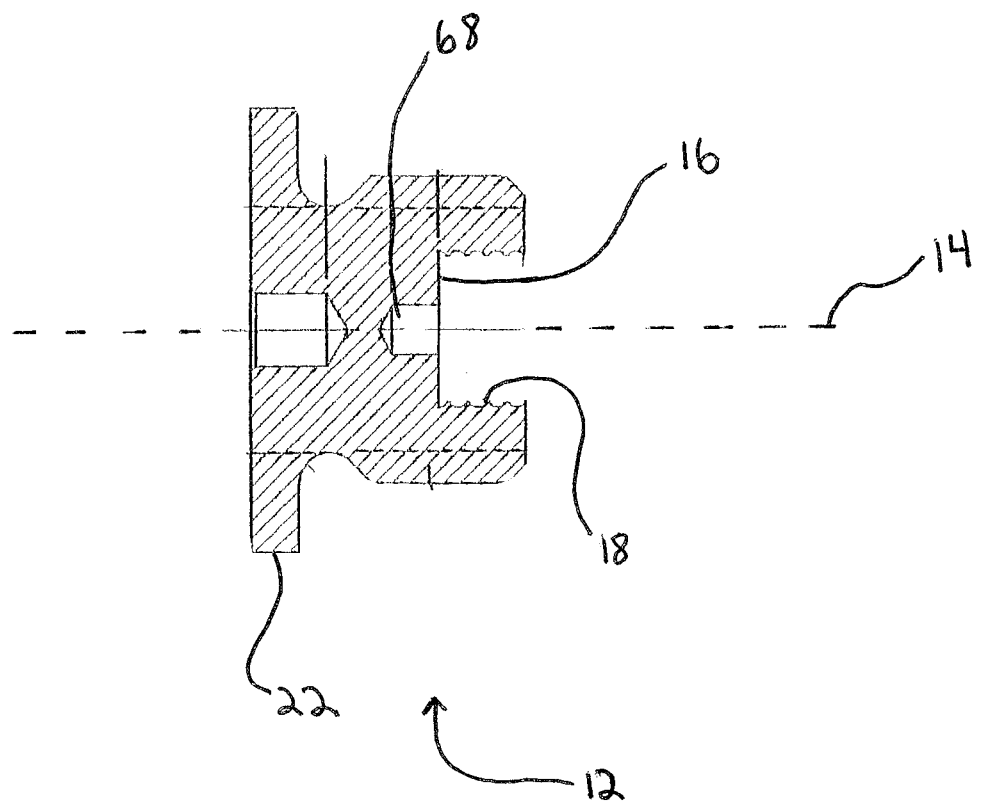

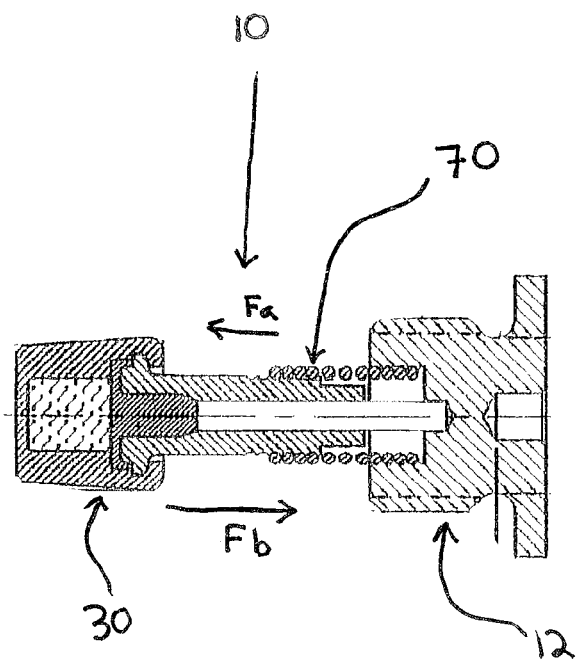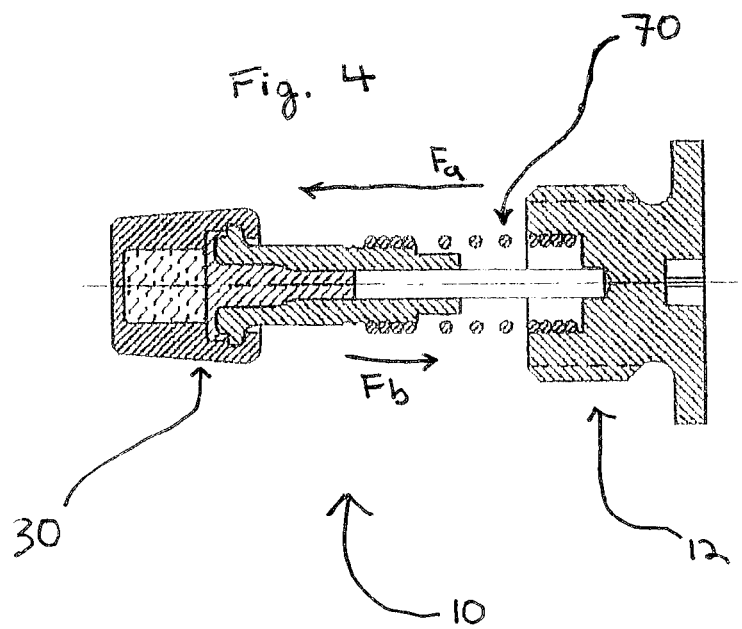

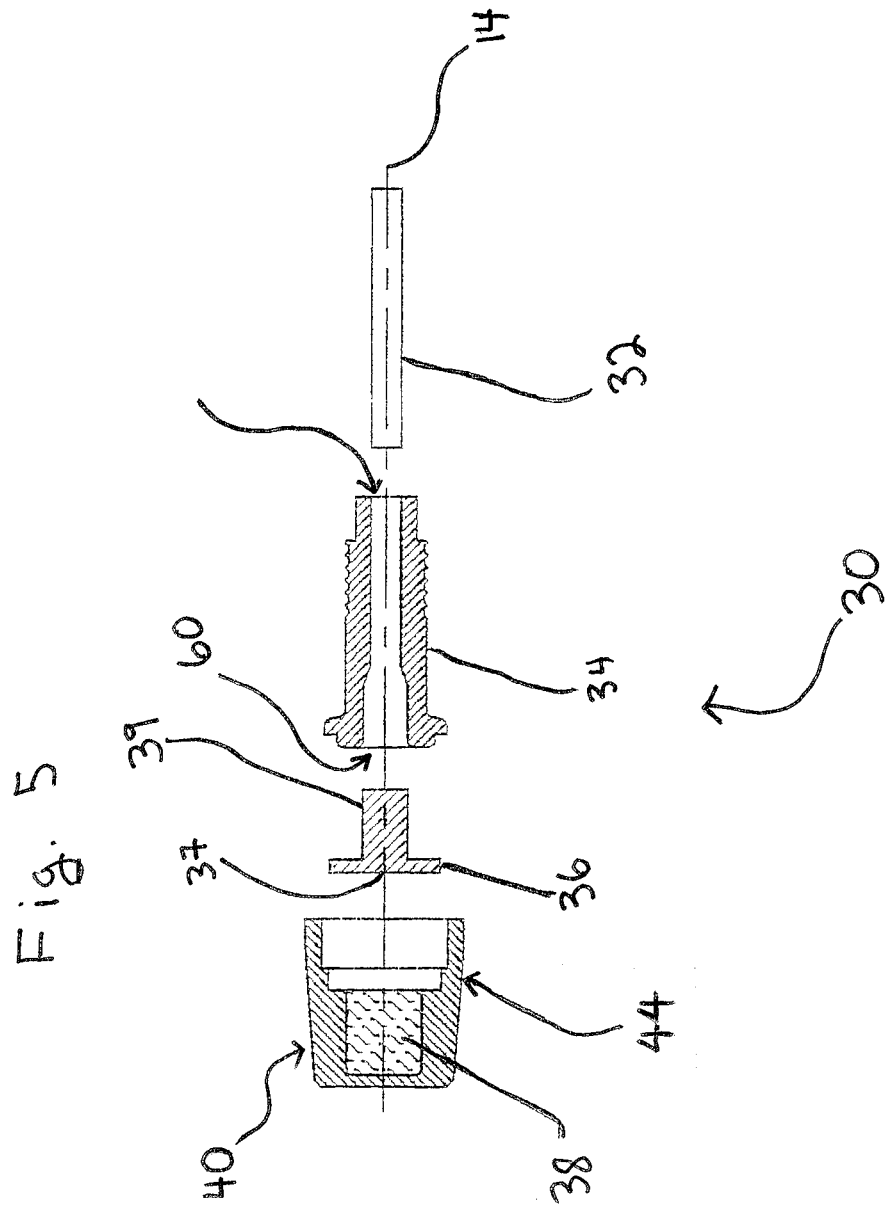

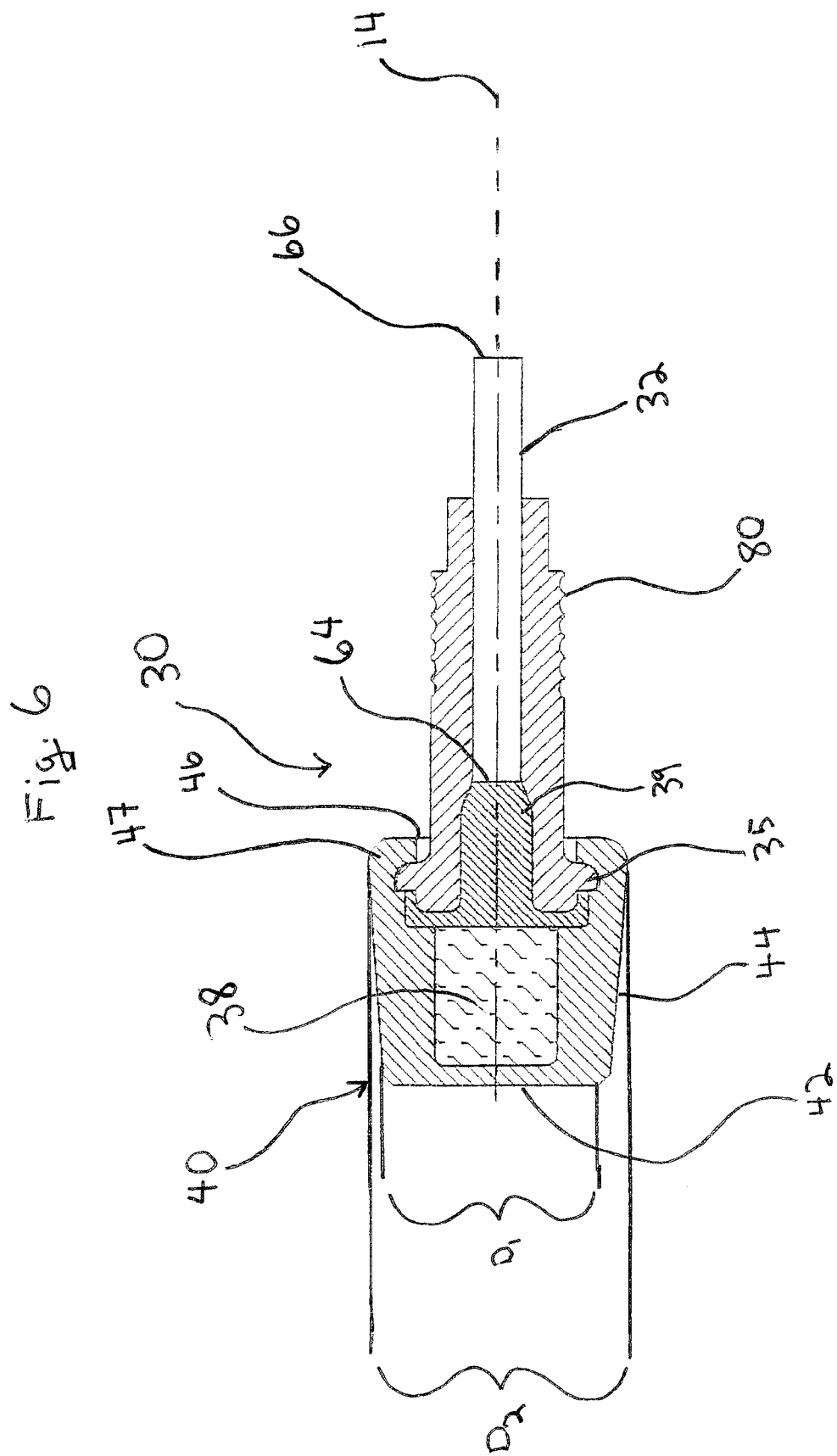

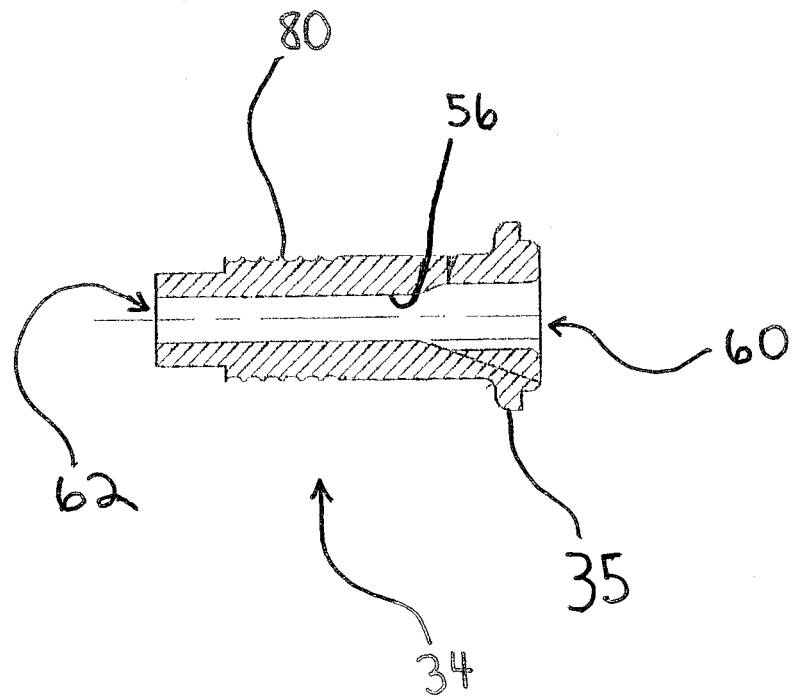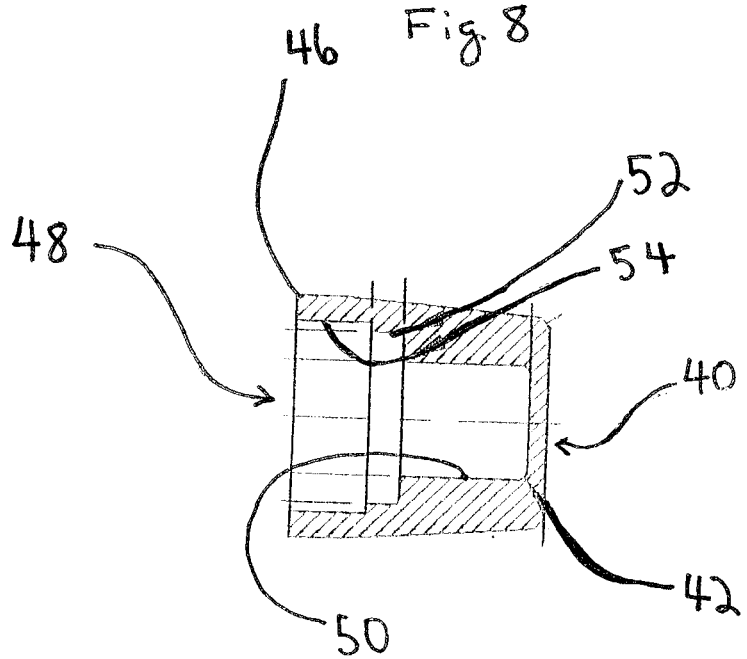

SELF-CONTAINED THERMALLY ACTUATED FLOW-CONTROL ASSEMBLY

BACKGROUND OF THE DISCLOSURE

The present disclosure relates to thermally actuated flow-control valves. More particularly, the present disclosure relates to valves including wax-filled actuators employed to control the flow of coolant to heat producing components in computing systems.

The use of wax-filled actuators or wax motors is well known. Wax motors have been employed to regulate the flow of fluids in a wide range of applications. Wax-filled actuators are utilized to prevent overheating in automotive systems and to regulate the flow of hot water in water heating systems for example. Such actuators are designed to open or close in response to a predetermined change in temperature. Wax-filled actuators are reliable temperature sensitive actuators that require no external energy, such as electricity or actuation force, such as a cable or lever.

In many temperature sensitive environments, it is desirable to stop or restrict flow of fluid to designated fluid passages when the fluid is cool and the wax actuator is closed. As the fluid warms up, the wax actuator begins to open, and permits fluid to flow. As the temperature of the fluid increases, the wax actuator progressively reaches its fully open, or fully "stroked" position, when the fluid reaches a predetermined operating temperature. The wax actuator fluctuates between the nominal opening position and the fully stroked position as the environmental temperature fluctuates.

The wax actuator conventionally comprises a rigid wax-filled cup, a guide and a piston received within the guide. The wax transitions between a solid and a liquid state over a predetermined temperature range, and typically expands in volume as the wax becomes a liquid. The guide is fixed to the cup and retains a flexible diaphragm to contain the wax in the cup. The guide defines an axial passage for a piston, which reciprocates in the axial passage according to pressure from the wax beneath the diaphragm. Thus, the axial length of the actuator changes according to the temperature of the wax, which is responsive to the temperature of the surrounding fluid.

The wax-filled actuator is typically positioned in a housing or aperture, with the piston arranged to deliver the force of the expanding wax to a valve member or to move the actuator body (the cup/guide) which may act as, or include a valve member. A return spring is also positioned to return the piston to its retracted/cold position when the temperature of the fluid falls and the wax returns to its smaller volume. The return spring is selected to overcome the friction of the piston in the axial passage and any linkage or valve associated with the actuator, to ensure reliable return to the closed or cold position.

The resulting valve assembly can be bulky, as the housing or aperture is sized to contain both the return spring and the wax-filled actuator. Generally speaking, there is demand for temperature actuated flow control valves that are compact and require as little volume as possible.

Fluid flow through a valve can be disrupted by turbulence caused by abrupt transitions of flow direction. Such abrupt transitions are typically associated with rapid changes of direction, such as when a fluid flows around a sharp corner. Compact fluid flow control valves can be prone to inefficient, turbulent flow because the smaller size of the fluid flow openings causes an increase in the rate of flow.

The need to position the actuator and return spring inside a housing or aperture complicates manufacture and/or assembly of the temperature sensitive fluid flow control valves.

Consequently there exists a need for a simple, compact and hydrodynamically improved thermally actuated flow-control valve.

SUMMARY

Briefly stated, in one embodiment the current disclosure is a self-contained thermally actuated flow-control valve assembly. The valve assembly comprises a base, an actuator, and a return member.

The base has a longitudinal axis, a stop surface extending transverse to the longitudinal axis, and a retention wall that extends axially away from the stop surface. In one embodiment the retention wall is radially spaced from the longitudinal axis and defines a generally cylindrical retention cavity. In an alternate embodiment, the retention wall is a cylindrical pillar that projects axially away from the stop surface and is coaxial with the longitudinal axis.

The actuator comprises a guide, a piston, a generally cylindrical cup, a thermally active wax pellet, and a diaphragm. The guide and piston are coaxial with the longitudinal axis, the piston being received within the guide. The guide has an exterior surface including a plurality of retention members. The generally cylindrical cup has a leading shoulder having a first diameter $D_1$ and a trailing shoulder having a second diameter $D_2$. The thermally active wax pellet is disposed in the cup and the diaphragm is disposed in the interior cavity between the pellet, and the guide and piston. The actuator cup is used as a valve member.

The return member has axially opposed first and second ends, and in one embodiment may comprise a coil spring. The first end of the return member engages the retention walls of the base, and the second end of the return member engages the retention members of the guide to mechanically connect the actuator to the base. The return member also exerts a biasing force on the actuator towards the base, eliminating the need for the bias member to be seated against a housing or part of the installed environment.

In an alternate embodiment of the valve assembly disclosed herein, the valve assembly additionally comprises a fluid-flow passageway. The passageway has first and second chambers, and an annular collar defining a fluid flow port provides fluid communication between the first and said second chambers. The annular collar has a diameter $D_1$. The first chamber is a source of heated fluid and the self-contained thermally actuated flow-control valve is arranged to regulate flow of fluid between the two chambers according to the temperature of the fluid in the first chamber.

The self-contained thermally actuated flow-control valve is mounted with the generally cylindrical cup at least partially received in the outlet port and exposed to fluid in the first chamber. The cup acts as a valve member by blocking fluid flow between the first and second chambers. The cup is configured to reduce turbulence in the fluid flow through the collar. The leading surface (closed end) of the generally cylindrical cup has a diameter $D_2$ and the trailing shoulder has a diameter $D_3$. The valve assembly is configured so that $D_1$ is larger than $D_3$, and $D_3$ is larger than $D_2$.

The flow control valve is variable between a first length $L_1$ at an environmental temperature below a first temperature $T_1$ and a second length $L_2$ at a second environmental temperature $T_2$. The generally cylindrical cup and annular collar are sized such that a limited volume of fluid may pass between the first and second chambers at an environmental temperature below $T_1$, e.g., during warm up when the cup is positioned within the collar. As the environmental temperature rises between $T_1$ and $T_2$, the actuator extends axially farther away from the base, creating an expanded fluid flow path through the collar past the cup and guide.

As will be appreciated by one of skill in the art, the disclosed valve assembly does not require a bulky housing as in traditional wax actuators. The flow-control valve does not require a housing, because the configuration of the base, return member and actuator allow the return member to mechanically connect the actuator to the base while serving the return bias function. The valve assembly may be used in a multitude of new applications as a result of the more compact and self-contained construction.

Additionally, the unique configuration of the cup and guide improves the hydrodynamic properties of the valve assembly. The shape of the cup and guide are designed to decrease any turbulence caused by fluids flowing past the valve assembly.

BRIEF DESCRIPTION OF THE DRAWINGS

The present disclosure may be better understood and its numerous objects and advantages will become apparent to those skilled in the art by reference to the accompanying drawings in which:

FIG. 2 shows a cross-sectional view of one embodiment of the base, the return member and actuator are omitted for clarity;

FIG. 3 shows a cross-sectional view of the embodiment of the valve assembly depicted in FIG. 1 as completely assembled; the valve assembly in FIG. 3 is depicted in a closed or "un-stroked" position;

FIG. 4 shows a cross-sectional view of the completely assembled valve assembly depicted in FIG. 3, the valve assembly in FIG. 4 is depicted in a full open or "fully stroked" position;

FIG. 5 shows an exploded cross-sectional view of one embodiment of the actuator; the base and return member are omitted for clarity;

FIG. 6 shows a cross-sectional view of the embodiment of the actuator depicted in FIG. 5 as completely assembled; the base and return member are omitted for clarity;

FIG. 7 shows a cross sectional view of the guide; the cup, thermally active pellet, diaphragm, piston, base and return member are omitted for clarity;

FIG. 8 shows a cross sectional view of the generally cylindrical cup; the thermally active pellet, diaphragm, guide, piston, base and return member are omitted for clarity;

DETAILED DESCRIPTION

With reference to the drawings, wherein like numerals represent like parts throughout the Figs., a self-contained thermally actuated flow-control valve assembly 10 is disclosed herein (hereafter "valve assembly"). The valve assembly 10 is configured to provide reliable and efficient control of fluids through a system as the environmental temperature in the system changes. Though the present disclosure primarily describes the valve assembly 10 as used in computer applications, the valve assembly 10 may be used in a number of other suitable environments.

Figure 1:
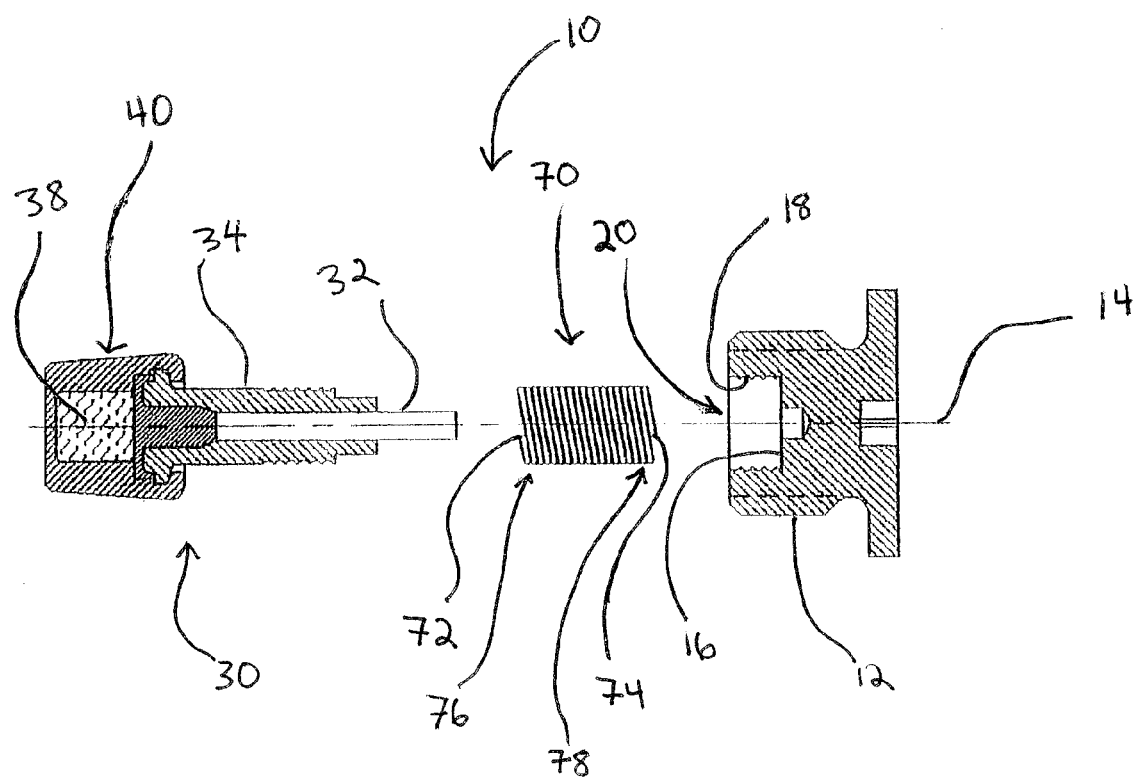
FIG. 1 shows an exploded cross-sectional view of an embodiment of the disclosed self-contained thermally actuated flow-control valve assembly.

The valve assembly 10 has a base 12, illustrated in FIGS. 1, 2, 3, 4, 9 and 10 as a generally cylindrical member, though other shapes may be used without departing from the invention described herein. With reference to FIGS. 1 and 2, the base 12 has a longitudinal axis 14 and a stop surface 16 which is oriented transverse to the longitudinal axis. The stop surface 16 extends radially outward from the longitudinal axis 14 and generally perpendicular thereto, while a retention wall 18 extends axially away from the stop surface 16 and generally parallel with the longitudinal axis 14.

Referring to one embodiment of the base depicted in FIGS. 1-4, the stop surface 16 and a retention wall 18 define a retention cavity 20. In the embodiment shown, the retention wall 18 is radially spaced from the longitudinal axis 14, located on the periphery of the stop surface 16, and extends axially away from the stop surface 16.

In the embodiment depicted in FIGS. 1-4, the base is also depicted having a flange 22. The flange 22 extends in a direction radially outward from the longitudinal axis 14. The flange 22 is provided to facilitate a secure connection between the valve assembly 10, and a wall of a temperature regulating chamber of a server bank or other structure.

Figure 9:
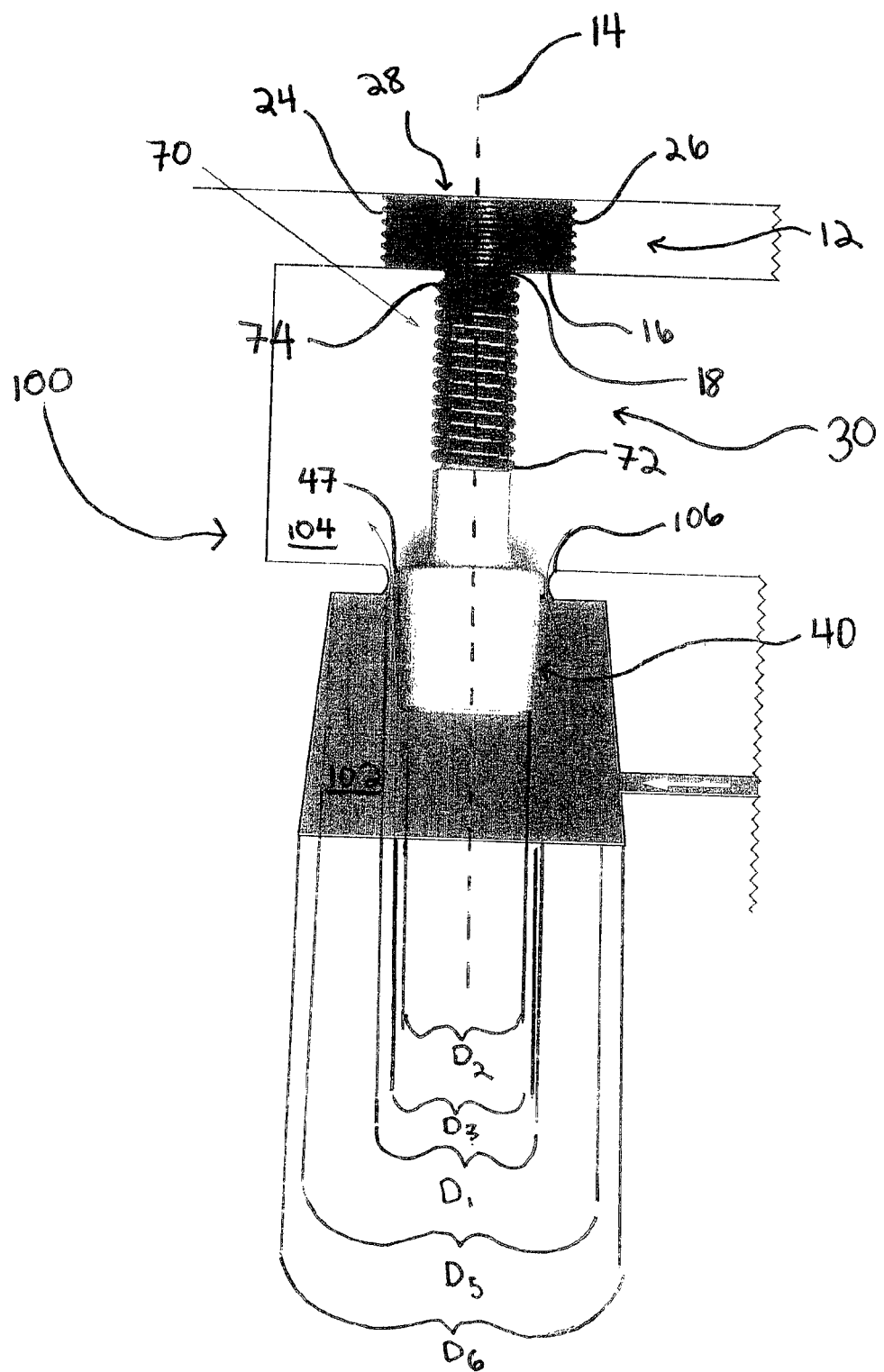
FIG. 9 shows one alternate embodiment of the self-contained thermally actuated flow-control valve assembly at an environmental temperature below $T_1$; the fluid-flow passageway is shown in cross section and the valve assembly is shown in profile.
Figure 10:
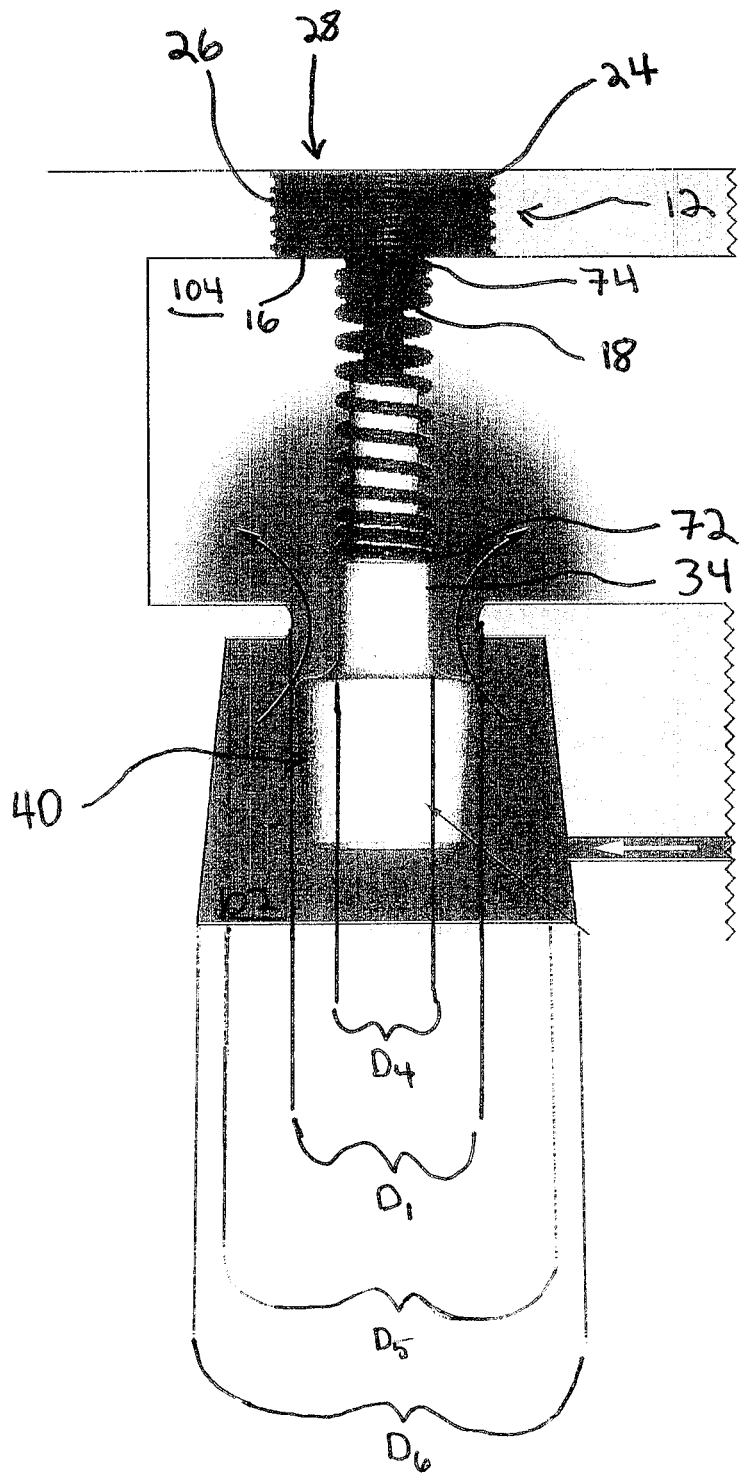
FIG. 10 shows the embodiment of the valve assembly depicted in FIG. 9 at an environmental temperature of $T_2$; the fluid flow passageway is shown in cross section and the valve assembly is shown in profile.

In an alternate embodiment of the base depicted in FIGS. 9 and 10, the retention cavity 20 and flange 22 are omitted, in favor of alternate connection means. As shown in FIGS. 9 and 10, the retention wall 18 in the alternate embodiment is a solid cylindrical pillar. The pillar projects axially away from the stop surface 16, and is coaxial with the longitudinal axis 14.

As depicted in FIGS. 9 and 10, the base 12 is generally cylindrical, and has an outer surface 24 having a plurality of threads 26. The stop surface 16 extends radially away from the retention wall 18 and longitudinal axis 14, and meets the outer surface 24 at its periphery. The base 12 of the alternate embodiment may be screwed into a corresponding threaded receptacle 28 disposed in a wall of the temperature regulating chamber of the server bank. As depicted in FIGS. 9 and 10, the base 12 and receptacle 28 act as corresponding male and female portions of a threaded connection, respectively.

Though the connection between the valve assembly and the wall of the temperature regulating chamber of a server are depicted in one embodiment as a flange 22 and in an additional embodiment as a threaded connection 26 and 28, a multitude of other connection systems may be utilized to secure the valve assembly with respect to a working environment.

As shown in FIGS. 1, 5 and 6, an actuator 30 comprises a piston 32 and guide 34 coaxial with the longitudinal axis 14, a diaphragm 36, a thermally active wax pellet 38 and a generally cylindrical cup 40. The piston 32, guide 34 and cup 40 may be made from brass, or another suitable material. The diaphragm 36 is usually formed from nitrile rubber and has a generally flat, circular base 37 and a projection 39 which extends axially away from the base 37.

The thermally active wax pellet 38 comprises a thermally responsive hydrocarbon wax of the type typically employed in wax thermostatic elements. A specific composition of thermally responsive wax is selected for use in the actuator 30, having very specific characteristics with respect to temperature. The thermally responsive wax is solid at room temperature, but progressively melts over a predetermined range of temperature, $T_1$ and $T_2$. As the wax progressively transitions from a solid to a liquid between $T_1$ and $T_2$, the volume of the wax increases. In one embodiment of the disclosed valve assembly, $T_1$ is approximately 104° F. and $T_2$ is approximately 122° F. As used herein, when referring to temperature, the term "approximately" means a range plus or minus five (5) degrees Fahrenheit on either side of the stated temperature.

Referring specifically to FIGS. 6 and 8, the generally cylindrical cup 40 has a leading wall 42 (the closed end of the cup), a sidewall 44, and a trailing shoulder 46 surrounding the open end of the cup. The leading wall 42 is contiguous with the sidewall 44. Travelling down the sidewall axially away from the leading wall 42, the generally cylindrical cup terminates in the trailing shoulder 46. In the embodiment depicted in the Figs., the leading wall has a diameter $D_1$ and the trailing shoulder has a diameter $D_2$. In one embodiment the cup 40 is frustoconically shaped such that $D_1$ is smaller than $D_2$. In an alternate embodiment the cup 40 is frustoconically shaped such that $D_1$ is larger than $D_2$.

In the embodiment of the valve assembly 10 depicted in FIGS. 1, 3-6 and 8, the ratio $D_1$ to $D_2$ ranges between 1.2:1 and 1.1:1.

Referring specifically to FIG. 8, the leading wall 42, sidewall 44 and trailing shoulder 46 of the cup 40 define an interior pellet cavity 48. The pellet cavity 48 is stepped, so that a bottom portion 50 has a smaller diameter than an intermediate portion 52, and the intermediate portion 52 has a smaller diameter than a terminal portion 54. The thermally active pellet 38 is received in the bottom portion 50, the generally flat circular base 37 of the diaphragm 36 is received in the intermediate portion 52, the projection 39 and guide 34 and the remaining portion of the diaphragm are received in the terminal portion 54 of the pellet cavity.

Once the thermally active pellet 38, diaphragm 36, and guide are properly configured in the pellet cavity 48, the trailing shoulder 46 is crimped around a radially projecting shoulder 35 of the guide. The trailing shoulder 46 is crimped to create a generally rounded radius 47. The arc of the generally rounded radius 47, and the ratio $D_1:D_2$ give the actuator superior hydrodynamic properties in high pressure, high velocity fluid flow environments.

Referring specifically to FIG. 7, the guide 34 has interior and exterior surfaces, 56 and 58, respectively. The guide 34 is generally cylindrical, and oriented coaxial with the longitudinal axis 14 when the actuator 10 is completely assembled. First and second longitudinal openings 60 and 62, respectively, are defined at axially opposed ends of the guide 34.

Referring specifically to FIGS. 5 and 6, the projection 39 of the diaphragm is received in the first longitudinal opening 60, while the piston 32 is received in the second longitudinal opening 62. The piston 32 has first and second axially opposed ends 64 and 66, respectively. The piston 32 is coaxial with the longitudinal axis 14, and the first piston end 64 abuts the stop surface of the base 16. The piston 32 is axially slideable within the interior surface 56 of the guide 34.

In one embodiment depicted in FIGS. 2, 3 and 4, the stop surface of the base 16 may have a small depression or seat 68, sized to receive the first piston end 64. The seat 68 provides a stable mechanical connection between the actuator 30 and the base 12, and ensures that the second piston end 66 does not slide on the stop surface 16 during operation.

As shown in FIGS. 1, 3 and 4, a return member 70 engages the actuator 30, and exerts a return biasing force upon the actuator in the direction $F_b$ towards the base 12. In one embodiment of the disclosed valve assembly, the retention member 70 may be a coil spring with first and second terminal wire ends 72 and 74. As shown in FIG. 1, the return member has first and second ends 76 and 78, respectively, corresponding to first and second terminal wire ends 72 and 74.

The coil spring may be formed of spring steel, stainless steel, or any suitable material which provides a consistent biasing force $F_b$, over many thousands of thermal cycles.

Referring specifically to FIGS. 6 and 7, a plurality of retention members 80 are configured on the exterior surface 58 of the guide 34 to engage the return member first end 76. In one embodiment of the disclosed valve assembly, the retention members 80 are threads having a pitch slightly greater than the diameter of the wire of the coil spring. The retention members 80 and the return member 70 act as corresponding male and female portions of a threaded connection, respectively.

As the return member end first end 76 is threaded onto the retention members 80, the pitch of the return member threads 80 spread the individual loops of the coil spring slightly apart from one another. The slight spread between the individual loops of the coil spring creates a frictional engagement which prevents the return member 70 from back-threading and disengaging from the actuator 30, thus ensuring a strong connection between the return member first end 76 and the actuator.

The return member second end 78 engages the base 12, anchoring the actuator 30 to the base 12, placing the return member in tension between the actuator and the base, with biasing force $F_b$ directed towards the base 12. In the embodiment of the disclosed valve assembly illustrated in FIGS. 1-4, the retention wall 18 may be threaded. In this embodiment, the return member 70 and retention wall 18 act as male and female portions of a threaded connection, respectively. The pitch of the threads of the retention wall 18 is slightly greater than the diameter of the wire of the coil spring.

As the return member second end 68 is threaded into the retention cavity 20, the threads of the retention wall 18 spread the individual loops of the coil spring slightly apart from one another. The slight spread between the individual loops of the coil spring creates a frictional engagement which prevents the return member 70 from back-threading and disengaging from the actuator 30, thus ensuring a strong connection between the return member second end 78 and the retention wall 16. In one embodiment, the second terminal end of the coil spring 74 may project outwardly to a barb or point to bite into the material of the retention wall 18, further resisting disconnection of the return member 70 from the retention wall 18.

In the embodiment of the disclosed valve assembly illustrated in FIGS. 9 and 10, the retention wall 18 is also threaded. In this embodiment, the return member 70 and retention wall 18 act as female and male portions of a threaded connection, respectively. The pitch of the threads of the retention wall 18 is slightly greater than the diameter of the wire of the coil spring.

As the return member second end 78 is threaded onto the retention wall 18, the pitch of the retention wall threads 18 spread the individual loops of the coil spring slightly apart from one another. The slight spread between the individual loops of the coil springs prevents the return member 70 from back-threading and disengaging from the retention wall 18, thus ensuring a strong connection between the return member second end 78 and the retention wall 18.

The valve assembly 10 reciprocates between a fully closed, or "unstroked" position, and a fully open, or "fully stroked" position. While FIG. 3 illustrates the valve assembly 10 in an unstroked position, FIG. 4 illustrates the valve assembly 10 in a fully stroked position.

The pellet 38, diaphragm 36 and piston 32 exert a variable actuating force, $F_a$, in a direction axially opposite the biasing force, $F_b$, exerted by the return member 70. The amount of force $F_a$ that the actuator exerts is dependent upon the environmental temperature.

As the environmental temperature approaches $T_1$, the variable actuating force $F_a$ approaches the biasing force $F_b$. Once the environmental temperature surpasses $T_1$, the actuating force $F_a$ exceeds the biasing force $F_b$ and the actuator 30 extends axially away from the base 12. When the environmental temperature reaches $T_2$, all of the wax is melted, and the valve assembly 10 assumes the fully stroked configuration shown in FIG. 4.

FIGS. 9 and 10 show an alternate embodiment of the thermally actuated flow-control valve assembly 10 as employed in a temperature regulating chamber of a server bank, or similar computing environment. In the embodiment depicted in the Figs., the flow-control valve assembly 10 is disposed in a fluid flow passageway 100. Though the fluid flow passageway 100 depicted in the Figs. is a simplified illustration of a passageway in a temperature regulating chamber of a server bank, the assembly may conceivably be utilized in any environment where one area or volume must be fluidly separated from another.

The fluid flow passageway 100 has first and second chambers 102 and 104, respectively. An annular collar 106 defines a fluid flow passage, allowing fluid communication between the first and second chambers 102 and 104. The annular collar 106 has a diameter $D_1$.

In the embodiment depicted in FIGS. 9 and 10, the leading wall 42 of the cup 40 has a diameter $D_2$, while the trailing shoulder 46 has a diameter $D_3$. In one embodiment the actuator 30 and annular collar 106 are sized so that $D_3$ is larger than $D_2$, and $D_1$ is larger than $D_3$.

In one embodiment of the assembly depicted in FIGS. 9 and 10, the first chamber 102 is frustoconically shaped. In this embodiment the first chamber 102 has a first wall having a first diameter $D_5$, the first wall having the annular collar 106 and defining the fluid flow port. A second wall of the first chamber is disposed axially opposite the first wall, and has a second diameter $D_6$.

In one embodiment the frustoconical shapes of the first chamber 102 and the generally cylindrical cup 40 are manufactured to be mirror opposites. For example, if $D_3$ of the generally cylindrical cup 40 is larger than $D_2$, the first diameter of the first chamber $D_5$ is smaller than the second diameter $D_6$.

In another embodiment the arrangement of the frustoconically shaped cup and first chamber is reversed. In this embodiment of the valve assembly, $D_2$ of the cup 40 is larger than $D_3$, and $D_5$ of the first chamber 102 is larger than $D_6$.

Designing the cup 40 and first chamber as frustoconically shaped mirror opposites has been shown to improve the flow of fluid between the first chamber 102 and second chamber 104. This arrangement creates a vortex-like flow pattern around the cup 40, decreasing turbulence, and increasing the hydrodynamic properties of the valve assembly.

As depicted in FIGS. 9 and 10, the base 12 of the valve assembly 10 is installed in the second chamber 104 and the actuator 30 extends axially toward the first chamber 102 with the cup 40 acting as a valve member. At an environmental temperature below temperature $T_1$, the actuator 30 has a length $L_1$. Below T1, the actuator 30 is at least partially received in the annular collar 106. As shown in FIG. 10, when the environmental temperature reaches $T_2$, the actuator extends to its full length $L_2$, and more of the actuator 30 is received in the first chamber 102.

$D_3$ and $D_1$ are sized so that a limited amount of fluid may pass between the first and second chambers 102 and 104 below $T_1$. In FIGS. 9 and 10 the magnitude of fluid flow is indicated by the arrows, such that a thinner line denotes a comparatively smaller magnitude of fluid flow, and a thicker line a comparatively larger magnitude of fluid flow. As the length of the actuator increases between $L_1$ and $L_2$, greater volumes of fluid may flow between the first and second chambers 102 and 104.

Referring specifically to FIG. 10, the guide 34 has a diameter $D_4$. The ratio of the diameter of the guide $D_4$ to the diameter of the annular collar $D_1$ also improves the hydrodynamic properties of the valve assembly 10. In the embodiment illustrated in FIG. 10, the ratio $D_4:D_1$ is selected from a range between 0.4:1 and 0.6:1.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

The invention claimed is:

1. A self-contained thermally actuated flow-control valve assembly configured for operable installation in a receptacle defined by a wall of a temperature regulating chamber, the self-contained thermally actuated flow-control valve assembly comprising:
    a stationary base fixed within the receptacle, having a longitudinal axis and having a stop surface transverse to said longitudinal axis, and a retention wall extending axially away from said stop surface;
    an actuator having
    a guide coaxial with said longitudinal axis and having interior and exterior surfaces defining axially opposed longitudinal openings, said exterior surface having a plurality of retention members,
    a piston coaxial with said longitudinal axis and received in said longitudinal opening having axially opposed first and second piston ends, said first piston end abutting said stop surface of said base,
    a cup having a leading wall, a sidewall contiguous with said leading wall, said sidewall having a trailing shoulder disposed axially opposite the leading wall, said leading wall, sidewall and trailing shoulder defining an interior cavity, said leading wall having a first diameter $D_1$ and said trailing shoulder having a second diameter $D_2$,
    a thermally active pellet received in said interior cavity of said cup,
    a diaphragm received in said interior cavity between said thermally active pellet and said guide and in contact with said second piston end,
    said actuator having a length measured from said first end of said piston to said leading wall of said cup;
    a longitudinally extending return member, said return member having axially opposed first and second ends, said return member first end engaging said retention members of said guide, and said return member second end engaging said base, said return member exerting a biasing force on said actuator towards said base and securing said actuator to said base; and
    wherein said thermally active pellet, diaphragm and piston act in concert to exert a variable actuating force in a direction axially opposite said biasing force and said actuating force propels said guide and cup away from said stationary base along said longitudinal axis.

2. The self-contained thermally actuated flow-control valve assembly of claim 1, wherein said variable actuating force increases between a first environmental temperature $T_1$ and a second environmental temperature $T_2$ such that the variable actuating force exerted by said pellet, diaphragm and piston above $T_1$ is greater than said biasing force, and wherein between $T_1$ and $T_2$ said actuator extends progressively axially further away from said base.

3. The self-contained thermally actuated flow-control valve assembly of claim 2, wherein $T_1$ is approximately 104° Fahrenheit and $T_2$ is approximately 122° Fahrenheit.

4. The self-contained thermally actuated flow-control valve assembly of claim 1, wherein an exterior sidewall surface of said cup is frustoconical, said trailing shoulder has a generally rounded circumferential edge, and wherein $D_2$ is larger than $D_1$.

5. The self-contained thermally actuated flow-control valve assembly of claim 1, wherein an exterior sidewall surface of said cup is frustoconical, said trailing shoulder has a generally rounded circumferential edge, and wherein $D_1$ is larger than $D_2$.

6. The self-contained thermally actuated flow-control valve assembly of claim 4, wherein a ratio of $D_2:D_1$ is selected from a range between 1.2:1 and 1.1:1.

7. The self-contained thermally actuated flow-control valve assembly of claim 5, wherein a ratio of $D_1:D_2$ is selected from a range between 1.2:1 and 1.1:1.

8. The self-contained thermally actuated flow-control valve assembly of claim 1, wherein said return member comprises a coil spring having a wire, and wherein said wire has a diameter and first and second axially opposed terminal ends corresponding to said first and second axially opposed ends of said return member.

9. The self-contained thermally actuated flow-control valve assembly of claim 8, wherein said retention members are threads having a pitch slightly greater than said diameter of said wire, so that said retention members and said spring act as the male and female portions of a threaded connection respectively.

10. The self-contained thermally actuated flow-control valve assembly of claim 8, wherein said retention wall is radially disposed from said longitudinal axis and said retention wall and said stop surface define a generally cylindrical retention cavity, and wherein said retention wall has threads having a pitch slightly greater than the diameter of said wire, so that said retention wall and said spring act as the female and male portions of a threaded connection respectively, and wherein said end of said spring wire projects radially outwardly and frictionally engages said retention wall.

11. The self-contained thermally actuated flow-control valve assembly of claim 8, wherein said retention wall is a solid cylindrical pillar projecting axially away from the stop surface and coaxial with said longitudinal axis, and wherein said retention wall has threads having a pitch slightly greater than said diameter of said wire, so that said retention wall and said spring act as the male and female portions of a threaded connection respectively.

12. A self-contained thermally actuated flow-control valve assembly configured for operable installation in a receptacle defined by a wall of a temperature regulating chamber, the self-contained thermally actuated flow-control valve assembly comprising:

a stationary base fixed within the receptacle, having a longitudinal axis and having a stop surface transverse to said longitudinal axis, and a retention wall extending axially away from said stop surface;

an actuator having a generally cylindrical guide having an exterior surface and defining an inner cavity, a plurality of retention members configured on said exterior surface, a piston assembly coaxial with said longitudinal axis and received in said inner cavity, a cup having a leading wall having a first diameter $D_1$, a sidewall contiguous with said leading wall, said sidewall having a trailing shoulder having a second diameter $D_2$ said trailing shoulder disposed axially opposite the leading wall;

a longitudinally extending return member having axially opposed first and second ends, said first end engaging said retention members and said second end engaging said base, said return member securing said actuator to said base, and exerting a biasing force on said actuator axially towards said base; and wherein said actuator exerts a variable actuating force dependent upon an environmental temperature, said actuating force acting in a direction axially opposite said biasing force, and said actuating force propels said guide and cup away from said stationary base along said longitudinal axis.

13. The self-contained thermally actuated flow-control valve assembly of claim 12, wherein said variable actuating force increases between a first environmental temperature $T_1$ and a second environmental temperature $T_2$, such that the force exerted by said actuator above $T_1$ is greater than said biasing force, and wherein between $T_1$ and $T_2$ said actuator extends progressively axially further away from said base.

14. The self-contained thermally actuated flow-control valve assembly of claim 13, wherein $T_1$ is approximately 104° Fahrenheit and $T_2$ is approximately 122° Fahrenheit.

15. The self-contained thermally actuated flow-control valve assembly of claim 12, wherein an exterior sidewall surface of said cup is frustoconical, said trailing shoulder has a generally rounded circumferential edge, and wherein $D_2$ is larger than $D_1$.

16. The self-contained thermally actuated flow-control valve assembly of claim 12, wherein an exterior sidewall surface of said cup is frustoconical, said trailing shoulder has a generally rounded circumferential edge, and wherein $D_1$ is larger than $D_2$.

17. The self-contained thermally actuated flow-control valve assembly of claim 15, wherein a ratio of $D_2:D_1$ is selected from a range between 1.2:1 and 1.1:1.

18. The self-contained thermally actuated flow-control valve assembly of claim 16, wherein a ratio of $D_1:D_2$ is selected from a range between 1.2:1 and 1.1:1.

19. The self-contained thermally actuated flow-control valve assembly of claim 12, wherein said return member comprises a coil spring having a wire, and wherein said wire has a diameter and first and second axially opposed terminal ends corresponding to said first and second axially opposed ends of said return member.

20. The self-contained thermally actuated flow-control valve assembly of claim 19, wherein said retention members are threads having a pitch slightly greater than the diameter of said wire, so that said retention members and said spring act as the male and female portions of a threaded connection.

21. The self-contained thermally actuated flow-control assembly of claim 19, wherein said retention wall has threads having a pitch slightly greater than the diameter of said wire, so that said retention wall and said spring act as the female and male portions of a threaded connection, and wherein said axially opposed second terminal wire end projects radially outwardly and frictionally engages said retention wall.

22. The self-contained thermally actuated flow-control assembly of claim 19, wherein said retention wall is a solid cylindrical pillar projecting axially away from the stop surface and coaxial with said longitudinal axis, and wherein said retention wall has threads having a pitch slightly greater than said diameter of said wire, so that said retention wall and said spring act as the male and female portions of a threaded connection respectively.

23. The self-contained thermally actuated flow-control valve assembly of claim 1, wherein said fixed base further comprises an outer surface having a plurality of threads.

* * * * *